Oct. 18, 1938.  M. P. BLOMBERG  2,133,531
RAILWAY BRAKE RIGGING
Filed March 10, 1937    2 Sheets-Sheet 1
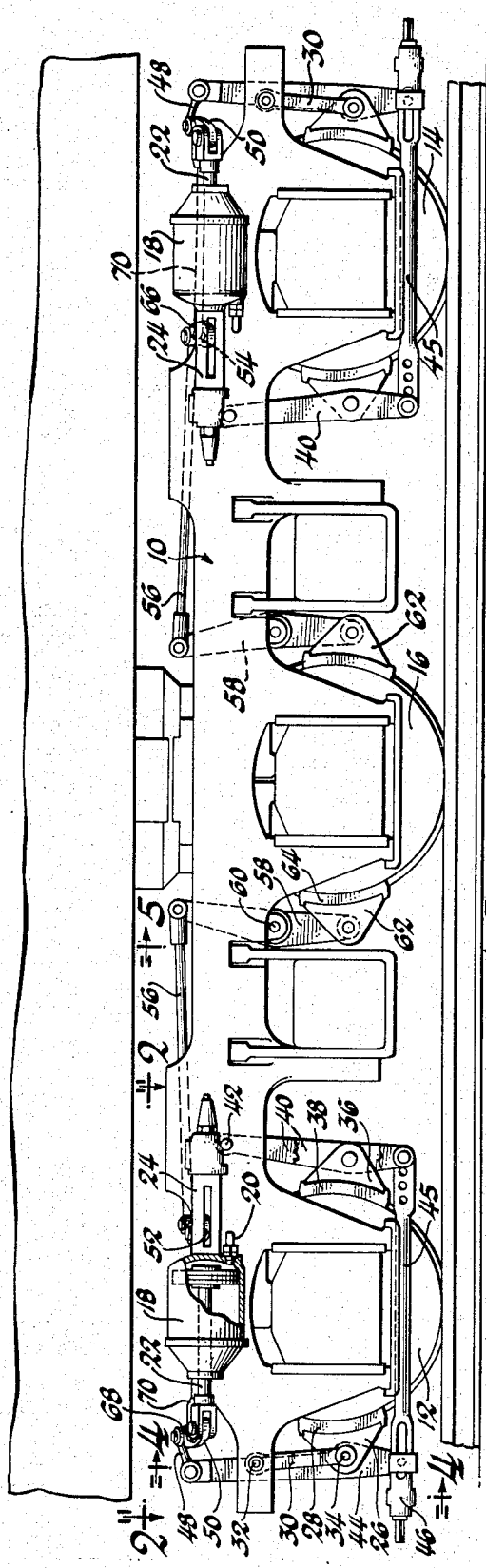
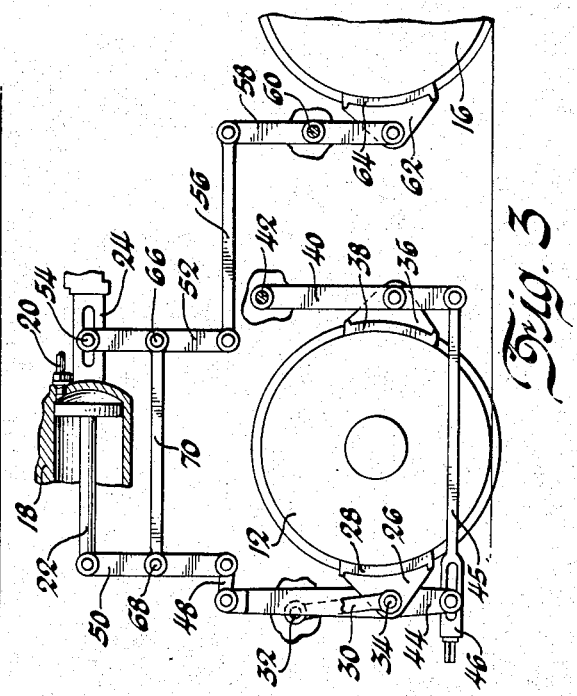
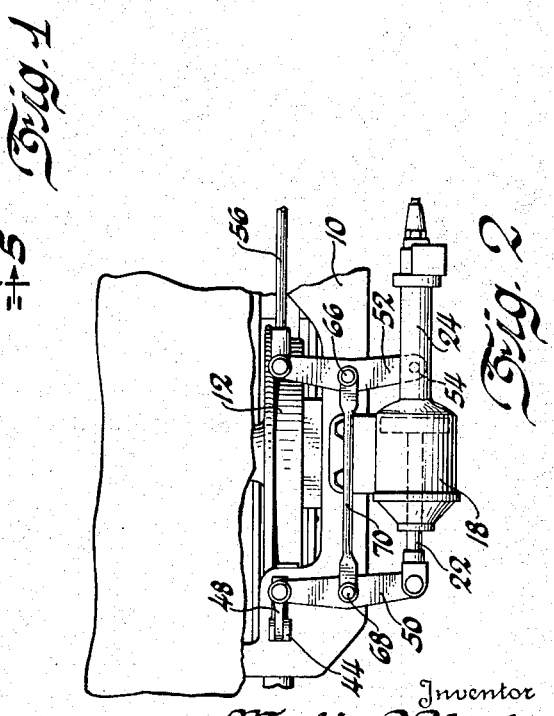
Inventor
Martin P. Blomberg
By Blackmore, Spencer & Hunt
Attorneys

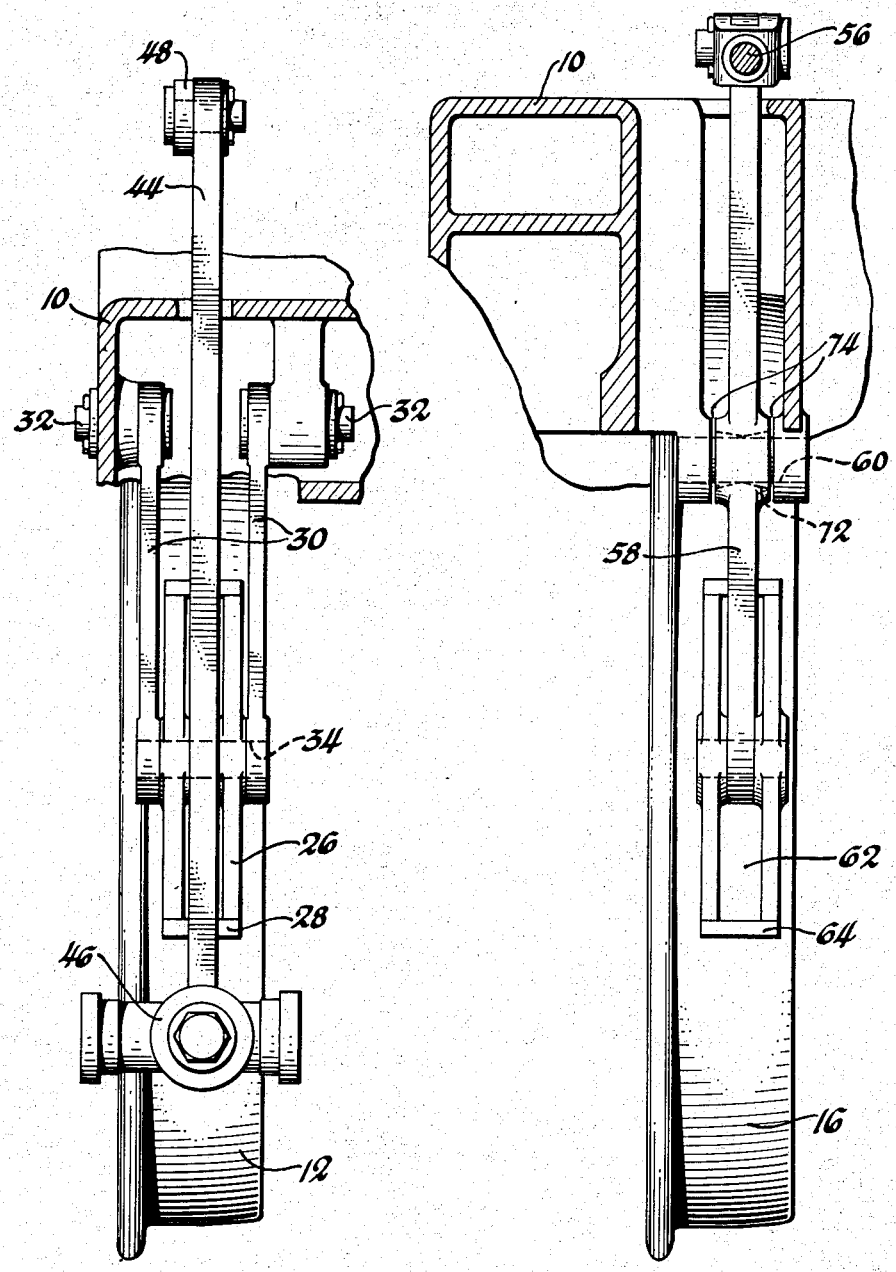

Patented Oct. 18, 1938

2,133,531

UNITED STATES PATENT OFFICE 2,133,531

RAILWAY BRAKE RIGGING

Martin P. Blomberg, Hinsdale, Ill., assignor to General Motors Corporation, Detroit, Mich., a corporation of Delaware Application March 10, 1937, Serial No. 130,003

18 Claims. (Cl. 188—46)

This invention relates to brake rigging for railway vehicles, and more particularly to a brake rigging for use on a six wheel truck, which rigging is composed of fewer parts than those heretofore devised, with the result that it will be simpler, lighter and more economical to produce, but will at the same time be thoroughly effective in operation, will be properly equalized at all times, and will be capable of withstanding the stresses it is subjected to during the most severe sort of service.

Other objects and advantages will be disclosed upon reference to the description and accompanying drawings, in which Fig. 1 is a side elevation of a six wheel truck, showing my improved brake rigging associated therewith.

Fig. 2 is a fragmentary plan view, taken on the line 2—2 of Fig. 1.

Fig. 3 is a diagrammatic view of the brake rigging at one end of the truck, showing the various parts of the rigging as they would appear if they were all placed in the same plane.

Fig. 4 is a sectional view, taken on the line 4—4 of Fig. 1, on a somewhat larger scale.

Fig. 5 is a sectional view, taken on the line 5—5 of Fig. 1.

The reference numeral 10 indicates a truck frame in which the outer wheels 12 and 14 and the center wheels 16, carried upon axles which are not shown, are journalled in the usual manner. Mounted on the truck frame at each end thereof is a brake operating cylinder 18 which is connected to a suitable source of pressure by a pipe 20. Extending from one end of each cylinder is a piston rod 22 and supported upon and operatively connected to the opposite end thereof is a slack adjuster 24 which may be of any of the well known manually or automatically operable types. In the balance of the description, since the brake riggings at opposite ends of the truck are identical, only one will be described.

Located at the outer side of the outer wheel is a brake head 26, carrying a brake shoe 28, and this brake head is supported by brake hangers 30 which are pivotally connected to the truck frame at 32 and to the brake head at 34. A brake head 36, carrying a brake shoe 38, is located at the opposite side of the outer wheel, and is supported by being pivotally connected between a pair of spaced apart dead truck levers 40, one of which is shown as being broken away at the left hand side of Fig. 1, which are pivotally secured to the truck frame at 42. Also secured to the brake head 26 at the pivotal connection 34 is a live truck lever 44, and the lower end of this lever is connected to the lower end of the levers 40 by a pair of tension rods 45 which straddle the wheel. A manually adjustable slack adjuster 46 of any suitable type is provided at the end of the tension rods which is connected to the live truck lever 44, and the upper end of the latter is connected by a pair of clevises 48 to a live cylinder lever 50, the opposite end of which is pivotally connected to the piston rod 22.

A fulcrum lever 52, pivotally connected at 54 to the automatic slack adjuster 24, has its opposite end connected by a link 56 with a dead truck lever 58 which is pivotally supported on the truck frame at 60. A brake head 62 carrying a brake shoe 64, which is adapted to engage the center wheel, is mounted on the lower end of the lever 58. Pivotally connected to the middle portion of the fulcrum lever at 66 and to the middle portion of the live cylinder lever at 68 is a pull rod 70.

Referring to Fig. 3, it will be seen that when the piston rod 22 moves to the left due to pressure being admitted to the cylinder, the upper end of the cylinder lever 50 will be moved to the left, causing the pull rod 70 to pull the fulcrum lever 52 to the left, the pivot point 54 where the fulcrum lever is connected to the automatic slack adjuster serving as the fulcrum point for the fulcrum lever. As the opposite end of the latter moves to the left, through the link 56 which is connected to it and to the dead truck lever, the latter is rocked about the fixed pivot point 60, with the result that the brake shoe 64 is forced against the center wheel. At the same time, since the pivot point 68 where the pull rod 70 is connected to the cylinder lever 50 serves as a floating fulcrum point, the lower end of the cylinder lever is rocked to the right, and through the clevis connections 48 causes the upper end of the live truck lever to move in that direction, thus causing the brake shoe 28 to be forced against the outer wheel. When this brake shoe comes into contact with the wheel, the pivotal connection 34 serves as a fulcrum point for the live truck lever, so that the lower end of the latter moves toward the left, whereupon the tension rods 45 cause the lower end of the dead truck lever 40 to also move to the left, the latter swinging about the fixed pivot point 42, and thereby forcing the brake shoe 38 against the outer wheel.

It will thus be seen that the layout of the connections of the various levers and rods to each other is such that the brake shoes will all be applied at the same time, and if the lengths of the lever arms on the truck levers were the same, the pressure applied by the operating cylinder would be equally distributed to each of the brake shoes. However, since in the usual form of six wheel truck the traction motors are located only on the outer axles, the weight supported by the center wheels is considerably less than that supported by the outer wheels, and consequently there would be a greater tendency for the center wheels to skid if the same braking effort were applied to them as is applied to the outer wheels.

I therefore make the length of the lever arm on the center wheel dead truck lever 58 shorter than are the lever arms on the live and dead truck levers employed in connection with the outer wheels, so that while the amount of braking effort transmitted through the rigging to the truck levers is the same in each case, due to the shorter lever arm provided on the truck lever for the center wheel, the brake shoe for that wheel is forced against it with sufficiently less pressure to insure that the center wheel will not tend to skid any more than the heavier loaded outer wheels.

In railway brake structures, it is desirable that the brake shoes be prevented from coming into contact with the flanges on the wheels, as if this occurs unnecessary wear takes place and noise is produced. Keeping the brake shoes from coming into contact with the wheel flanges is more of a problem on the center wheels of a six wheel truck than it is elsewhere, since when the truck is operating on curved track, the center axle together with the wheels mounted upon it move sideways a greater amount than do the outer axles and wheels. Therefore, in my improved brake rigging, as shown in Fig. 5, I support the center wheel dead truck lever 58 in such position on the truck frame that the brake head 62 and the brake shoe 64 will be located a greater distance away from the flange on the center wheels 16 than are the brake heads and shoes on the outer wheels. This, of course, means that the center wheels can move sideways a greater distance before the flanges on them come into contact with the brake shoes.

Since due to the relation of the width of the brake shoe to the width of the tread on the wheel, it is impracticable to locate the brake shoe far enough away from the flange on the center wheel so that the two can never come into contact, I have found it desirable to so support the center wheel dead truck lever 58 that it will be free to rock sideways a limited amount, so that if the center wheel does move sideways far enough to permit the flange on it to come into contact with the brake shoe 64, the latter, since it is carried on the brake head 62 which is supported on the lever 58, will be free to yield in the direction of the lateral movement of the center wheels, so that there will be no pressure exerted between the brake shoe and the wheel flange, and therefore no wear or noise will be produced. I accomplish this by constructing the pivotal mounting 60 where the lever 58 is supported on the truck frame in such manner that the lever 58 may have a limited amount of universal movement with respect to the truck frame. For example, as shown in Fig. 5, one way in which this may be done is to curve or bevel the opening through the lever 58 as at 72, so that the lever may rock a slight amount on the pin which forms the pivotal connection 60. With such a structure, a small amount of clearance is provided as at 74 between the sides of the center portion of the lever 58 and the mounting lugs on the truck frame, to permit the desired amount of rocking movement of the lever. Of course, any other suitable form of mounting which will permit the lever to rock sideways a slight amount relatively to the truck frame may be employed.

While I have shown and described a particular form of my invention, it will be understood that various changes in the structure may be made without departing from the spirit and scope of the appended claims.

I claim:

1. In a brake rigging for a pair of truck wheels, a live truck lever and a dead truck lever located on opposite sides of one of the wheels, said levers being connected together by a tension rod, a second dead truck lever located adjacent the other wheel, an operating cylinder, a cylinder lever adapted to be actuated by said cylinder, a fulcrum lever, a pull rod connecting said fulcrum lever with said cylinder lever, a member connecting said live truck lever with said cylinder lever, and a member connecting said second dead truck lever with said fulcrum lever.

2. In a brake rigging for a pair of truck wheels, a live truck lever and a dead truck lever located on opposite sides of one of the wheels, said levers being connected together by a tension rod, a second dead truck lever located adjacent the other wheel, an operating cylinder, a cylinder lever adapted to be actuated by said cylinder, a fulcrum lever, a pull rod connecting said fulcrum lever with said cylinder lever, a clevis connecting said live truck lever with said cylinder lever, and a link connecting said second dead truck lever with said fulcrum lever.

3. In a brake rigging for a pair of truck wheels, a live truck lever and a dead truck lever located on opposite sides of one of the wheels, said levers being connected together with a tension rod, a second dead truck lever located adjacent the other wheel, a cylinder lever, an automatic slack adjuster, a fulcrum lever pivotally connected to said slack adjuster, a pull rod connecting said fulcrum lever with said cylinder lever, means connecting the live truck lever with the cylinder lever, and means connecting the second dead truck lever with the fulcrum lever.

4. In a brake rigging for a pair of truck wheels, a live truck lever and a dead truck lever located on opposite sides of one of the wheels and connected together by a tension rod, a second dead truck lever located at one side of the other wheel, an operating cylinder, a cylinder lever operatively associated with one end of the cylinder, an automatic slack adjuster operatively associated with the other end of the cylinder, a fulcrum lever connected to the automatic slack adjuster, a pull rod connecting the fulcrum lever to the cylinder lever, a member connecting the live truck lever to the cylinder lever, and a member connecting the second dead truck lever to the fulcrum lever.

5. In a brake rigging for a pair of truck wheels, a truck frame, an operating cylinder supported on the truck frame, a dead truck lever pivotally mounted on said frame at one side of one of the wheels, a live truck lever located at the opposite side of said wheel and connected to the dead truck lever by a tension rod, a second dead truck lever pivotally mounted on said frame adjacent the other wheel, a cylinder lever adapted to be actuated by said operating cylinder, an automatic slack adjuster, a fulcrum lever pivotally connected to said slack adjuster, a pull rod connecting said fulcrum lever with said cylinder lever, means connecting the live truck lever with the cylinder lever, and means connecting the second dead truck lever with the fulcrum lever.

6. In a brake rigging for a pair of truck wheels, a truck frame, an operating cylinder supported on the truck frame, a dead truck lever pivotally supported on said frame at one side of one wheel, a live truck lever pivotally supported on said frame at the other side of said wheel, a pair of tension rods connecting the lower ends of said levers, a second dead truck lever pivotally supported on said frame at one side of the other wheel, a live cylinder lever operatively associated with one end of said cylinder, an automatic slack adjuster operatively associated with the opposite end of said cylinder, a fulcrum lever pivotally supported on said slack adjuster, a pull rod connecting said fulcrum lever with said live cylinder lever, a clevis connecting the live truck lever with the live cylinder lever, and a link connecting the second dead truck lever with the fulcrum lever.

7. In a brake rigging for a center and an outer wheel of a six wheel truck, a dead truck lever and a live truck lever located at opposite sides of the outer wheel and connected together by a tension rod, a dead truck lever located adjacent the center wheel, an operating cylinder, a cylinder lever adapted to be actuated by said cylinder, a fulcrum lever, a pull rod connecting said fulcrum lever with said cylinder lever, means connecting the outer wheel live truck lever with said cylinder lever, and means connecting the center wheel dead truck lever with said fulcrum lever.

8. In a brake rigging for a center and an outer wheel of a six wheel truck, a dead truck lever and a live truck lever located at opposite sides of the outer wheel, a pair of tension rods straddling the wheel and connecting the lower ends of the levers together, a second dead truck lever located at one side of the center wheel, an operating cylinder, a live cylinder lever adapted to be actuated from one end of said cylinder, an automatic slack adjuster adapted to be actuated from the other end of said cylinder, a fulcrum lever pivotally connected to said slack adjuster, a pull rod connecting said fulcrum and cylinder levers together, a member connecting said live truck lever with said cylinder lever, and a member connecting said second dead truck lever with said fulcrum lever.

9. In a brake rigging for a center and an outer wheel of a six wheel truck, a truck frame, a brake operating cylinder supported on said frame, an automatic slack adjuster operatively associated with said cylinder, a dead truck lever pivotally supported on said frame at one side of the outer wheel, a live truck lever located at the opposite side of the outer wheel, a pair of tension rods straddling the wheel and connecting the lower ends of the levers, a second dead truck lever pivotally supported on said frame at one side of the center wheel, a live cylinder lever adapted to be actuated by said cylinder, a fulcrum lever pivotally connected to said slack adjuster, a pull rod connecting the fulcrum lever with the cylinder lever, a clevis connecting the live truck lever with the cylinder lever, and a link connecting the second dead truck lever with the fulcrum lever.

10. In a brake rigging for a center and an outer wheel of a six wheel truck, a live truck lever and a dead truck lever located on opposite sides of the outer wheel, a pair of tension rods straddling said wheel and connecting the lower ends of said levers, a dead truck lever located at one side of the center wheel, a cylinder lever, a fulcrum lever, a pull rod connecting the fulcrum lever with the cylinder lever, a member connecting the live truck lever with the cylinder lever, and a member connecting the center wheel dead truck lever with the fulcrum lever, the length of the levers being so proportioned that less braking effort is exerted on the center wheel than on the outer wheel.

11. In a brake rigging for a center and an outer wheel of a six wheel truck, a live truck lever and a dead truck lever located on opposite sides of the outer wheel, a pair of tension rods straddling said wheel and connecting the lower ends of said levers, a dead truck lever located at one side of the center wheel, a cylinder lever, a fulcrum lever, a pull rod connecting the fulcrum lever with the cylinder lever, a member connecting the live truck lever with the cylinder lever, and a member connecting the fulcrum lever with the center wheel dead truck lever, the lever arm of the latter being shorter than that of the outer wheel truck levers in order that less braking pressure may be exerted upon the center wheel than on the outer wheel.

12. In a brake rigging for a center and an outer wheel of a six wheel truck, a live truck lever and a dead truck lever located on opposite sides of the outer wheel and connected together by a pair of tension rods straddling the wheel, a dead truck lever located at one side of the center wheel, a pivotal support for the center wheel dead truck lever, said pivotal support being adapted to permit the center wheel dead truck lever to move sidewise a limited amount to follow the lateral movement of the center wheel, a cylinder lever, a fulcrum lever, a pull rod connecting the cylinder and fulcrum levers together, a member connecting the live truck lever to the cylinder lever, and a member connecting the center wheel dead truck lever to the fulcrum lever.

13. In a brake rigging for a center and an outer wheel of a six wheel truck, a truck frame, a live truck lever and a dead truck lever located on opposite sides of the outer wheel, said levers being connected together by a pair of tension rods straddling the wheel, a dead truck lever located at one side of the center wheel and having a pivotal connection with the truck frame, said pivotal connection being sufficiently loose to permit the center wheel dead truck lever to move sidewise a limited amount as the center wheel moves laterally, a cylinder lever, a fulcrum lever, a pull rod connecting the cylinder and fulcrum levers together, a member connecting the live truck lever to the cylinder lever, and a member connecting the center wheel dead truck lever to the fulcrum lever.

14. In a brake rigging for a center and an outer wheel of a six wheel truck, a live truck lever and a dead truck lever located on opposite sides of the outer wheel, said levers being connected together by a pair of tension rods straddling the wheel, a dead truck lever located at one side of the center wheel, brake heads carried by said truck levers, a cylinder lever, a fulcrum lever, a pull rod connecting the fulcrum and cylinder levers together, a member connecting the live truck lever to the cylinder lever, and a member connecting the fulcrum lever to the center wheel dead truck lever, the latter being so located that the brake head carried by it will be located further from the flange of the center wheel than the brake heads carried by the outer wheel truck levers are located from the flange of the outer wheel.

15. In a six wheel railway car truck the combination of a truck frame including side members, wheel and axle assemblies disposed in supporting relation to said frame, power means disposed on each of said side members adjacent opposite ends thereof, and brake rigging independently operated by each of said power means, said brake rigging including a hanger lever disposed inwardly of a wheel, a live truck lever disposed outwardly of said wheel, straps connecting said levers, brake heads and brake shoes carried by said levers, a cylinder lever connected to said truck lever, a slack adjuster lever connected to said cylinder lever, and a connection from said slack adjuster lever to braking means for an adjacent wheel, said braking means comprising a dead truck lever fulcrumed from said side member and supporting a brake head and brake shoe for cooperation with said adjacent wheel.

16. In a brake rigging for a six wheel railway car truck the combination of a truck framework comprising integrally formed side members and end rails, power means mounted on said side members adjacent the opposite ends thereof, braking means associated with each of said power means and comprising a dead lever supported at one side of a wheel, a live lever supported on the opposite side of said wheel and projecting through a portion of said framework, a cylinder lever having its inner end connected to said live truck lever and its outer end connected to said power means, a slack adjuster lever fulcrumed at the opposite end of said power means and connected intermediate its ends to a point intermediate the ends of said cylinder lever, and a connection between the inner end of said slack adjuster lever and braking means for an adjacent wheel, said last named braking means including a truck lever fulcrumed from said side member and projecting through a portion of said framework.

17. In a six wheel railway car truck a framework, wheels and axles, power means mounted adjacent the four corners of said framework, and clasp brake means for each wheel, each of said power means being operable to actuate the brake means at opposite sides of one wheel and at one side of an adjacent wheel, said brake means for said first mentioned wheel including a dead lever supported inwardly of said wheel, a live lever supported outwardly thereof, and a cylinder lever connected between said live lever and said power means, a dead lever fulcrumed at the opposite end of said power means, a connection between said cylinder lever and said fulcrumed lever, and a connection between said fulcrumed lever and the brake means of said last mentioned wheel.

18. In brake rigging for a railway car truck a truck framework, wheel and axle assemblies, power means mounted on said framework adjacent the four corners thereof, clasp brakes for each wheel, a live cylinder lever, a dead cylinder lever, a connection between said levers, one of said levers having a connection to braking means associated with one wheel, and the other of said levers having a connection to operate a portion of the brake rigging associated with an adjacent wheel.

MARTIN P. BLOMBERG.